United States Patent [19]

Ishikawa

[11] Patent Number: 5,812,863
[45] Date of Patent: Sep. 22, 1998

[54] APPARATUS FOR CORRECTING MISSPELLING AND INCORRECT USAGE OF WORD

[75] Inventor: Masahiko Ishikawa, Ibaraki, Japan

[73] Assignee: Matsushita Electric Ind., Osaka, Japan

[21] Appl. No.: 312,417

[22] Filed: Sep. 26, 1994

[30] Foreign Application Priority Data

Sep. 24, 1993 [JP] Japan .................................. 5-238328

[51] Int. Cl.$^6$ .................................................. G06F 17/00
[52] U.S. Cl. ......................................................... 395/795
[58] Field of Search ........................ 364/419.01–419.18; 395/145, 146, 792–798

[56] References Cited

U.S. PATENT DOCUMENTS 5,218,536  6/1993  McWherter ........................ 364/419.12
5,359,707  10/1994  Sato ................................ 364/419.14 X

OTHER PUBLICATIONS

"Computer Programs for Spelling correction: An Experiment in Program Design", by J. L. Peterson, Lecture Notes in Computer Science, Springer Verlag 1980.

*Primary Examiner*—Almis R. Jankus
*Attorney, Agent, or Firm*—Price, Gess, Ubell

[57] ABSTRACT

The apparatus for correcting the misspelling and incorrect usage of a word according to the present invention enables, when a document is prepared, the proper correction of the misspelling and incorrect usage of a word which are frequently produced by the operator who is a non-native speaker of the language used in the document or a child. The present invention has been achieved in consideration of mistakes resulting from the difference between the language used in the document and the mother tongue of the operator. Specific examples of the causes of such mistakes are the difficulty the operator has in recognizing a specific sound, the characteristics of a noun and a verb which do not exist in the mother tongue of the operator, different sounds used to pronounce a phonogram depending on the language in which it is used, the existence of a dialect and a slang, the existence of a loan word, the inconsistent relationship between the sound used to pronounce a phonogram and the representation of the phonogram, the existence of an ideogram which is similar to but slightly different from another ideogram in configuration and which has different meanings depending on the language in which it is used.

7 Claims, 19 Drawing Sheets

FIG. 4

| WORD | USAGE | STANDARD |
|---|---|---|
| centre | 1000000000000000 | center |
| free | 1111111111111 | |
| ain't | 0000000000010000 | am not |
| . . . | . . . | . . . |

FIG. 5

■ STANDARD WORD (ALL)

☐ BRITISH   ☐ WRITTEN
☐ AMERICAN  ☐ COLLOQUIAL
☐ CANADIAN  ☐ SLANG
☐ SCOTTISH  ☐ VULGAR
☐ IRISH     ☐ POETIC
☐ INDIAN    ☐ DIALECTAL
☐ AUSTRALIAN ☐ RARE USAGE

IMPROPERLY SPELLED WORD delish (SLANG)

---

CANDIDATES delicious (STANDARD)
delist
deliver
deliverance (WRITTEN)
delict

---

[REPLACE] [ENTER] [PASS] [END]

FIG. 9

| WORD | USAGE |
|---|---|
| centre | 100000000000000 |
| free | 111111111111111 |
| ain't | 000000000010000 |
| . . . | . . . |

FIG. 15A

| ENGLISH-MISSPELLING JUDGING UNIT FOR JAPANESE | 31 |
|---|---|
| L-R JUDGING ELEMENT | mirror (鏡) : miller (粉屋) |
| OR-ER JUDGING ELEMENT | mirror (鏡) : mirrer (該当英語無し) NO ENGLISH EQUIVALENT |
| S-TH JUDGING ELEMENT | sink (沈む) : think (考える) |
| V-B JUDGING ELEMENT | curb (止め輪) : curve (曲線) |
| C-K JUDGING ELEMENT | = |

FIG. 15B

| INCORRECT-ENGLISH-USAGE JUDGING UNIT FOR JAPANESE 32 | |
|---|---|
| JAPANIZED-ENGLISH JUDGING ELEMENT | (誤) back mirror : バックミラー : (正) rear-view mirror<br>INCORRECT　　　　　　　　　　　　CORRECT |
| NON-ENGLISH-LOAN-WORD JUDGING ELEMENT | (独語からの外来語) Ente : エンテ (先尾翼) (英) canard<br>LOAN WORD FROM GERMAN |
| IRREGULAR-VERB JUDGING ELEMENT | lay, laid, laid, 置く : lie, lay, lain, 横たわる |
| INCORRECTLY-USED-WORD JUDGING ELEMENT | steal, 盗む : steel 鉄 |

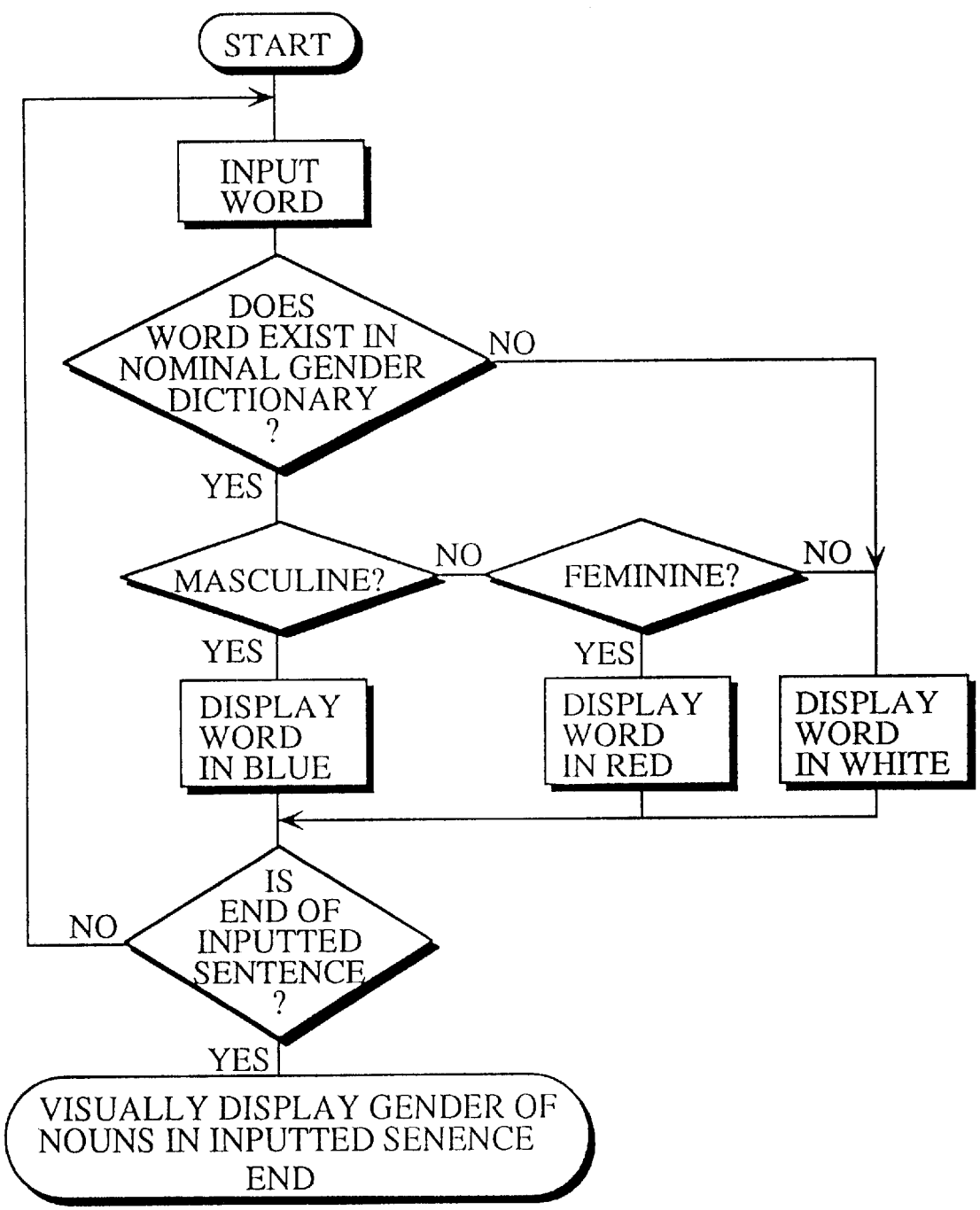

APPARATUS FOR CORRECTING MISSPELLING AND INCORRECT USAGE OF WORD

BACKGROUND OF THE INVENTION

1. Field of the Invention

The present invention relates to an apparatus for detecting an improperly spelled or used word in a document being produced in a foreign language and correcting the improper spelling or usage of the word by presenting candidates for the proper spelling or usage so that the operator can select among them.

2. Description of the Prior Art

As the global-scale internationalization has been proceeding in recent years, each nation has more opportunities to communicate in foreign languages. To support the preparation of a document in a language using an alphabet, such as English or French, there has been developed an apparatus for correcting misspelling, which is termed a "spell checker" or "spell corrector."

A conventional spelling correcting apparatus comprises, e.g., an input means 11, a misspelling detecting means 12, a dictionary for correcting spelling 13, a candidate-word generating means 14, a display means 15, and a selecting means 16, as shown in FIG. 1. The input means 11 is for accepting an English sentence. The spelling detecting means 12 is for detecting a misspelled word. The dictionary for correcting spelling 13 is for storing information on words for correcting misspelling. The candidate-word generating means 14 is for generating candidates for the correct spelling of misspelled words. The display means 15 is for displaying candidate words. The selecting means 16 is for the operator to select among the candidate words.

In the spell checker for an English text, a character inputter (operator) is expected to input an English sentence to the input means 11 composed of a keyboard or the like. Then, the spelling detecting means 12 internally provided with a CPU checks whether or not each word in the inputted sentence is correctly spelled.

At this stage, the matching of the spelling of each word in the inputted sentence against the correct spelling in the dictionary for correcting spelling 13 is performed. Since the matching process has been disclosed in, e.g., "Computer Programs for Spelling Correction" by J. L. Peterson (Springer-Verlag, 1980), the detailed description thereof will be omitted here. In the matching process, the interchange of two characters (e.g., OR and RO) and the detection of a skipped, extra, or mistyped word are primarily performed procedures. If a word is matched against the dictionary for correcting spelling 13 and the result indicates a possibility that the word is misspelled, the candidate-word generating means 14 generates candidate words for the correct spelling by the action of the spelling detecting means 12, so that the display means 15 presents them to the operator. FIG. 2 shows an example of the screen displayed. The operator selects a word having the intended spelling from the candidate words being presented, by using the selecting means 16. In the case shown in FIG. 2, if the operator selects the correct candidate word and presses the "REPLACE" button, the word in question in the text is replaced with the word having the intended spelling. In this case, if the word is not misspelled, the correction of the spelling can be omitted. If the candidate words do not include the word having the intended spelling, it is also possible to enter the word having the intended spelling in a user dictionary (not shown).

However, the conventional structure mentioned above is lacking in consideration of spelling which is used only in a limited area (British spelling or Canadian spelling, if English is taken as an example) and slang or colloquial usages. Consequently, if an English letter to an American contains British spelling or if a strictly formal document contains a slang, it is impossible to correct it.

Such problems are not limited to the case where an English document is prepared by a Japanese, but are caused frequently when a document is prepared in a language different from the mother tongue of the operator. Such problems also arise when a document is prepared by a child.

Moreover, since the operation of the spell checker is based on mistakes often made by Europeans, such as French, in writing in another European language (a family of language) such as English, it has not been devised in consideration of mistakes made by people who have difficulty in distinguishing between specific consonants or vowels because of their specific cultural and linguistic backgrounds. For example, a native speaker of an Uralic language or an Altaic language is apt to misspell R for L and vice versa, since he has difficulty in distinguishing between L and R. If a native speaker of English prepares a document in Japanese, he has difficulty in distinguishing between the "H" consonant group and the "F" consonant group.

If a person is to write in a foreign language entirely different from his mother tongue, misspelling-prone factors are not limited to consonants. In addition, there are a large number of misspelling-prone words and characters. For example, a native speaker of Japanese will have difficulty in recognizing the presence or absence of R or W or in distinguishing between C and K and between TH and S when he writes in English. On the other hand, a native speaker of English will find difficulty in distinguishing between OU and OO when he inputs a Japanese text (e.g., "Tokyo" is spelled as such in Roman letters, though it is pronounced as "TOOKYOO" by most native speakers of Japanese).

Although each language has some loan words from other languages, there is a case where a non-native speaker of English thinks that a loan word that has been adopted from a non-English language, such as German or French, has English origin. If he uses, based on his misconception, the loan word as it is in an English text he is preparing, the word becomes meaningless. For example, the Japanese equivalent to "an electric outlet" in English is "コンセント (konsento)," which is considered by quite a few Japanese people as an English word. Therefore, a native speaker of Japanese often writes "concent" or "konsento," instead of writing "an electric outlet." However, no consideration has been given to such a problem.

On the other hand, European or American people may have difficulty in correctly using a Chinese character or a word consisting only of Chinese characters either in a Japanese text or a Chinese text and in distinguishing between Chinese characters of similar configurations. However, no consideration has been given to such a problem, either.

Moreover, although each language has its own usages, aside from word usages, which cannot easily be understood by foreigners or children, no measure has been taken to lessen the difficulty. For example, a Japanese would have difficulty in distinguishing among the nominal genders of an European language and in recognizing its irregular verbal conjugations. However, no measure has been taken, either, to lessen the difficulty.

In addition, no man-machine interface that is available at low price and that can be used easily has been devised.

Furthermore, no consideration has been given to a relationship between the mother tongue of the operator and a foreign language he uses in a document to be prepared.

SUMMARY OF THE INVENTION

The present invention has been achieved in view of the foregoing. It is therefore an object of the present invention to provide an apparatus for correcting the misspelling and incorrect usage of a word whereby the misspelling and improper usage of a word can be found and corrected properly by the operator who is preparing a document in a foreign language, irrespective of the language used in the document, whether the operator is a child or a non-native speaker of the language. The apparatus for correcting the misspelling and incorrect usage of a word is implemented in consideration of the characteristics of a language used in a document being prepared and of the misspelling and improper usage of a word specific to the language.

Another object of the present invention to provide an apparatus for correcting the misspelling and incorrect usage of a word which enables, if the language used in a document being prepared is different from the mother tongue of the operator, the effective detection of mistakes resulting from different characteristics and historical circumstances of both languages. The causes of such mistakes include an irregular or exceptional relationship between the pronunciation of a word and its spelling, the existence of the masculine, feminine, and neuter genders of nouns, irregular verbal conjugations, the existence of loan words from another language, the existence of a slang and a dialect, and the existence of a rule which is exceptional but frequently used. The apparatus of the present invention is constituted in consideration of the above mistakes and their causes. The apparatus of the present invention is also constituted so as to correct mistakes resulting from the difficulty with which the operator belonging to a specific language group recognizes a specific sound and from the fact that the characteristics of nouns and verbs used in a document being prepared are extremely different from one language to another.

Still another object of the present invention is to provide a low-price man-machine interface which can be used easily by the operator who is preparing a document in a foreign language.

Still another object of the present invention is to provide an apparatus for correcting the misspelling and incorrect usage of a word which notifies, if a formal document being prepared contains spelling used only in a limited area, a slang, an archaic word, or a misused loan word, the operator of the presence of such spelling and words so that he can make a correction, irrespective of the type of the language used in the document.

Still another object of the present invention is to provide an apparatus for correcting the misspelling and incorrect usage of a word which supports the preparation of a document using either American English or British English, depending on the nationality of the addressee, if the document is a letter.

Still another object of the present invention is to provide an apparatus for correcting the misspelling and incorrect usage of a word which enables the operator, who is a Japanese or a child, to find the misspelling and incorrect usage of a word in a document he is preparing and to properly correct them.

Still another object of the present invention is to provide an apparatus for correcting the misspelling and incorrect usage of a word which enables, when an European or an American prepares a Japanese document in Roman letters or Kana letters (a type of Japanese characters), the operator to find out the misspelling and incorrect usage of a word in the document he is preparing and to properly correct them.

The above objects can be attained by an apparatus for correcting the misspelling of a word for an apparatus for preparing a document, having input means to which at least one of a sentence, a word, and a character in a language used in a document to be prepared is inputted, storing means for storing the inputted sentence, word, or character, and display means for displaying the sentence, word, or character stored in the storing means, which comprises: a dictionary for detecting misspelling which stores information including a combination of the correct spelling of a frequently misspelled word and at least one misspelling of the word, the information being generated in consideration of at least one of those causes of misspelling which are different sounds used to pronounce the same character in different languages, an inconsistent relationship between a phonogram and its pronunciation or the difficulty the operator has in understanding the inconsistent relationship, the existence of a sound which cannot easily be recognized by a foreigner, selective use of a plurality of sets of phonograms which indicate the same set of sounds depending on the types of the words in which they are used, the existence of a loan word, and the existence of a word which is indigenous to the mother tongue of the operator but which is often considered as a foreign word; misspelling detecting means for examining and judging whether or not each inputted word is stored as a misspelled word in said dictionary for detecting misspelling at least either in the case where a word or sentence was inputted or in the case where the preparation of the document was substantially completed; misspelling-candidate-word-display control means for receiving, if said misspelling detecting means detected the inputted word stored in said dictionary for detecting misspelling as a word having a possibility of being misspelled, the notification of the result of detection and controlling the display means so that it performs display which notifies the operator of the word; and misspelling correcting means for controlling the display means so that it displays the information stored in combination with said word in said dictionary for detecting misspelling and performing, for the word of which the misspelling-candidate-word-display control means notified the operator, at least one of the operations of correcting the misspelling if the word is misspelled verifying that the word is correctly spelled, and entering the word for learning.

The above object can also be attained by an apparatus for correcting the misspelling of a word for an apparatus for preparing a document, which further comprises supplemental-misspelling-detecting-dictionary adding means for adding a supplemental dictionary stored in a memory to said dictionary for detecting misspelling, said supplemental dictionary for is detecting misspelling: being generated in consideration of at least one of those causes of misspelling which are the difficulty in recognizing and distinguishing a specific sound from another sound due to the difference between the mother tongue of the operator and the language used in preparing the document, different sounds used to pronounce the same phonogram in the mother tongue of the operator and in the language used in preparing the document, different phonograms used to indicate the same sound in the mother tongue of the operator and in the language used in preparing the document, different sounds used to pronounce the same phonogram or different phonograms used to indicate the same sound in the language used in the document being prepared and the difficulty in understanding their relationship, different representations used to indicate the same sound in the language used in the document being prepared and the difficulty in understanding their relationship; and being stored in a detachable memory.

The above object can also be attained by an apparatus for correcting the misspelling of a word for an apparatus for preparing a document, wherein said input means has a hand-written-ideogram input unit to which a hand-written ideogram can be inputted and said dictionary for detecting misspelling has a subdictionary for detecting the misspelling of an ideogram which was prepared in consideration of at least one of those causes of misspelling which are the similarity in configuration and the same pronunciation, The above object can also be attained by an apparatus for correcting the misspelling and incorrect usage of a word for an apparatus for preparing a document, having input means to which at least one of a sentence, a word, and a character in a language used in a document to be prepared is inputted, storing means for storing the inputted sentence, word, or character, and display means for displaying the sentence, word, or character stored in the storing means, which comprises: usage specifying means whereby the usage of each word used in a document to be prepared can be specified; a dictionary for detecting incorrect usage which stores a combination of information on the usage of each word and information including an equivalent word in another usage; incorrect-usage detecting means for judging, in at least either one of the cases where a word or sentence was inputted or where the preparation of the document was substantially completed, whether or not the usage of each inputted word which was specified by said usage specifying means is stored in said dictionary for detecting incorrect usage and thereby detecting the incorrect usage of the word; incorrect-usage-candidate-word-display control means for receiving, if said incorrect-usage detecting means detected the inputted word stored in said dictionary for detecting incorrect usage as a word having a possibility of being misused, the notification of the result of detection and controlling the display means so that it performs display which notifies the operator of the word; and incorrect-usage correcting means for performing, for the word of which the incorrect-usage-candidate-word-display control means notified the operator, at least one of the operations of correcting the incorrect usage if the word is misused, verifying that the word is correctly used, and entering the word for learning.

The above object can also be attained by an apparatus for correcting the misspelling and incorrect usage of a word for an apparatus for preparing a document, wherein said usage-specifying means enables, for each word used in the document to be prepared, the specification of at least one of official usage, dialectal usage, slang usage, infant usage, vulgar usage, colloquial usage, archaic usage, rare usage, and poetic usage, said dictionary for detecting incorrect usage stores a combination of information on the type of usage of each word which can be specified by said usage-specifying means and information on a synonymous word in a usage not specified for a word of concern, and said incorrect-usage detecting means judges whether or not the usage of the inputted word stored in said dictionary for detecting incorrect usage matches the usage specified by said usage specifying means and, in the case of mismatching, detects the incorrect usage of the inputted word, said apparatus for correcting the misspelling and incorrect usage of a word further comprising a display control unit for supporting usage correction, said display control unit for supporting usage correction controlling, if said incorrect-usage detecting means detects the incorrect usage of the inputted word, a display unit so that it displays the information which is stored, in combination with said misused word, in said dictionary for detecting incorrect usage.

The above object can also be attained by an apparatus for correcting the misspelling and incorrect usage of a word for an apparatus for preparing a document, having input means to which at least one of a sentence, a word, and a character in a language used in a document to be prepared is inputted, storing means for storing the inputted sentence, word, or character, and display means for displaying the sentence, word, or character stored in the storing means, which comprises: a dictionary for detecting incorrect usage for storing a combination of information on words frequently misused which have been listed up in consideration of the difference in character, structure, and sound between the language used in the document to be prepared and the mother tongue of the operator and information on the correct usages of the words; incorrect-usage detecting means for searching, in at least either one of the cases where a word or sentence was inputted or where the preparation of the document was substantially completed, the content of said dictionary for detecting incorrect usage so as to judge whether or not each inputted word is stored in said dictionary for detecting incorrect usage; incorrect-usage-candidate-word-display control means for receiving, if said incorrect-usage detecting means detected an inputted word which is stored in said dictionary for detecting incorrect usage as a word having a possibility of being misused, the notification of the result of detection and controlling the display means so that it performs display which notifies the operator of the word; and misspelling correcting means for controlling the display means so that it displays, for the word of which the incorrect-usage-candidate-word-display control means notified the operator, the information stored in combination with said word in said dictionary for detecting incorrect usage and performing one of the operations of correcting the incorrect usage if the word is misused, verifying that the word is correctly used, and entering the word for learning.

The above object can also be attained by an apparatus for correcting the misspelling and incorrect usage of a word for an apparatus for preparing a document, wherein the incorrect usage of a word resulting from the difference between the language used in the document being prepared and the mother tongue of the operator, which is stored in said dictionary for detecting incorrect usage, are caused by one of those difficulties the operator has, which are: the difficulty in selecting the proper conjugation for an irregular verb; the difficulty in selecting the proper gender for a noun or in using the proper article or verbal conjugation depending on the gender of a noun; the difficulty in recognizing a loan word of the language used in the document being prepared or of the mother tongue of the operator or in writing the loan word in the proper representation; and the difficulty in properly using the singular form or plural form for a noun and said dictionary for detecting incorrect usage is produced depending on the mother tongue of the operator, said apparatus for correcting the misspelling and incorrect usage of a word further comprising incorrect-usage-detecting-dictionary changing/selecting means which enables the changing or selecting of the portion to be searched for detecting incorrect usage in said dictionary for detecting incorrect usage.

The above object can also be attained by an apparatus for correcting the misspelling and incorrect usage of a word for an apparatus for preparing a document, further comprising:

a nominal-gender dictionary for storing a pair of a noun and its gender in the language used in a document to be prepared; and nominal-gender-selective-display control unit for controlling a display unit so that, in at least either one of the cases where a word or sentence was inputted or where the preparation of the document was substantially completed, each inputted noun is selectively displayed in a specific color, depending on its gender, in accordance with information on each noun and its gender which are stored in a pair in said nominal-gender dictionary.

BRIEF DESCRIPTION OF THE DRAWINGS

These and other object, advantages and feature of the invention will become apparent from the following description thereof taken in conjunction with the accompanying drawings which illustrate a specific embodiment of the invention. In the drawings:

FIG. 4 is a view showing an example of the content of a spelling correcting dictionary with usage/standard word of the above embodiment;

FIG. 5 is a view showing an example of the screen displayed by a usage setting means of the above embodiment;

FIG. 6 is a view showing a screen for selecting a candidate word of the above embodiment;

FIG. 9 is a view showing an example of the content of a misspelling correcting dictionary with usage of the above embodiment;

Figure 15C:
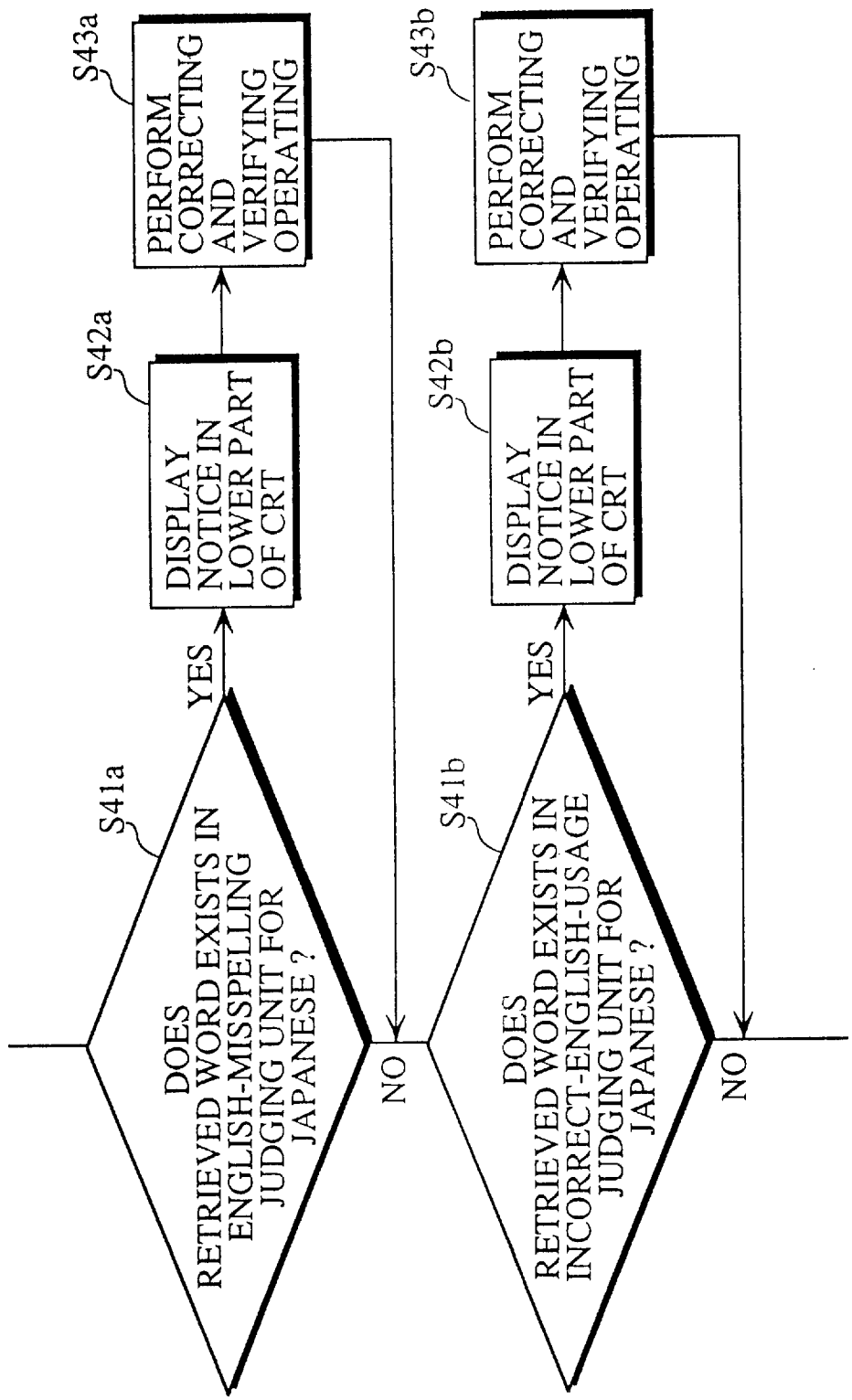
Figure 16A:
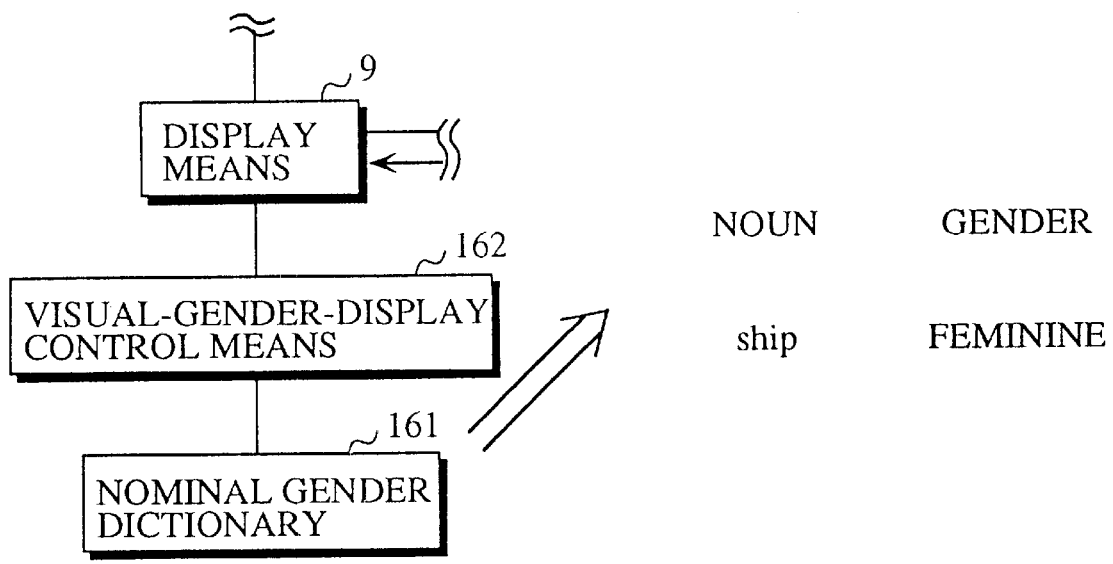

FIG, 14 is a flow chart showing the operation of still another embodiment of the apparatus for correcting the improper spelling and improper usage of a word according to the present invention;

FIGS. 15A, 15B and 15C are views showing the structure and operation peculiar to still another embodiment of the apparatus for correcting the improper spelling and improper usage of a word according to the present invention; and FIGS. 16A and 16B are views showing the structure and operation peculiar to still another embodiment of the apparatus for correcting the improper spelling and improper usage of a word according to the present invention.

DESCRIPTION OF THE PREFERRED EMBODIMENTS

Below, the embodiments of the present invention will be described with reference to the drawings.

First Embodiment

Figure 1:
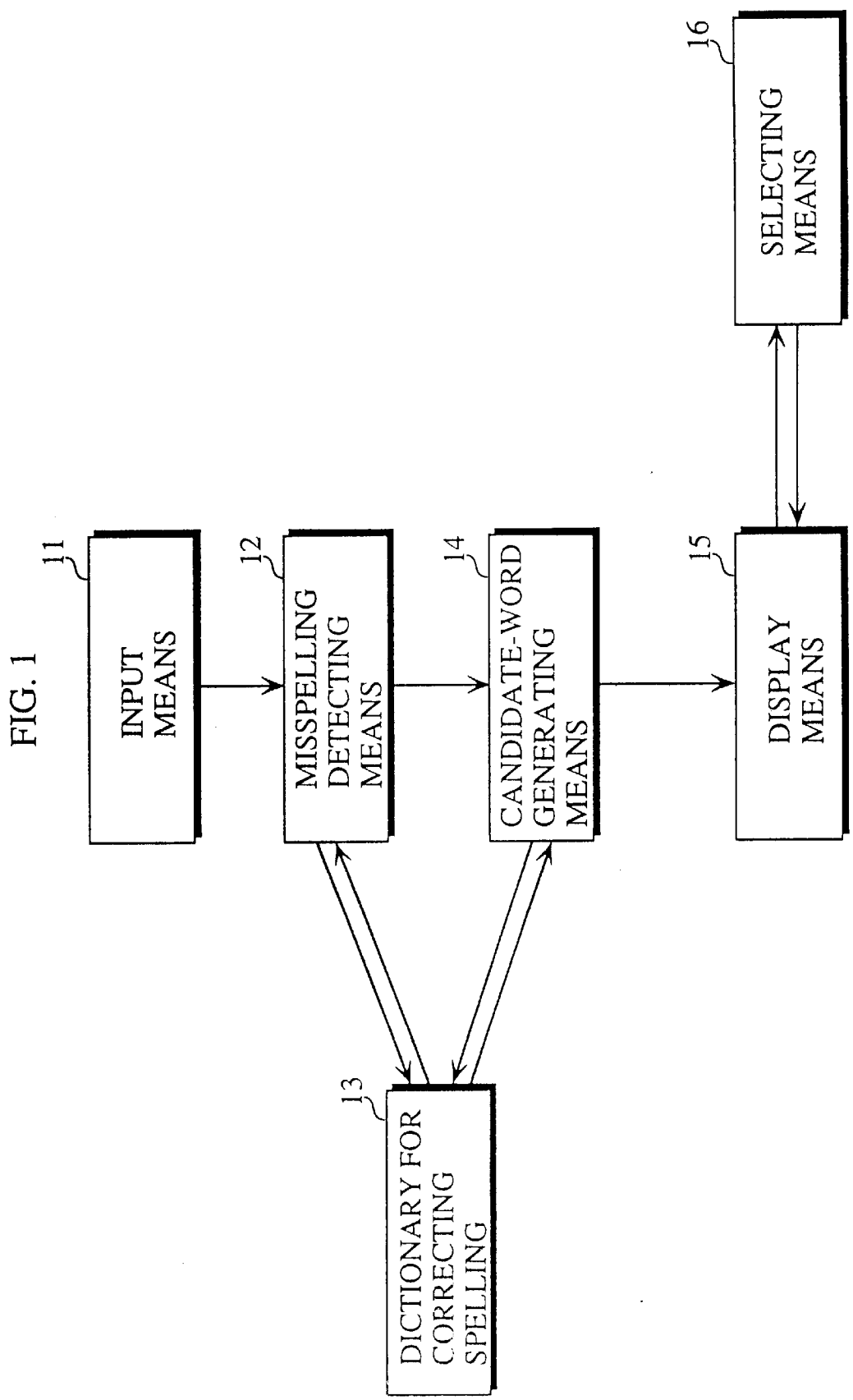
FIG. 1 is a block diagram of a conventional apparatus for correcting misspelling.
Figure 2:
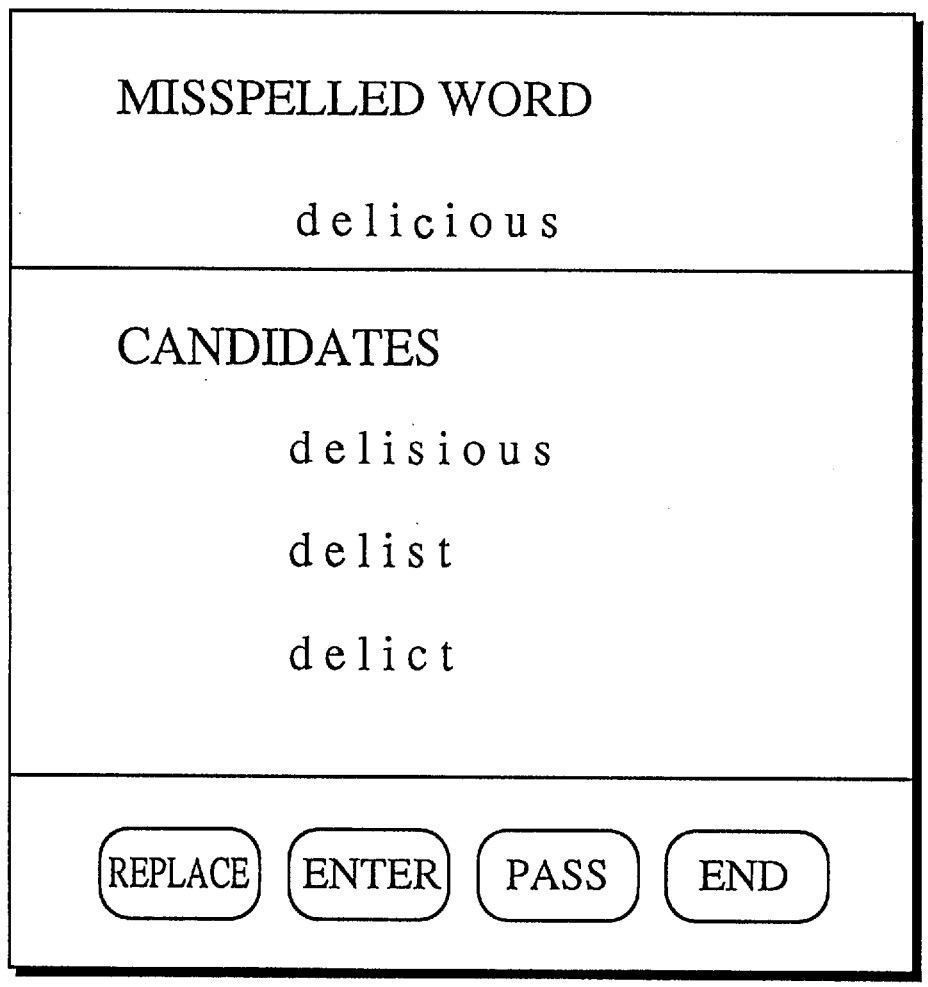
FIG. 2 is a view showing a screen for selecting a candidate word of the conventional apparatus for correcting misspelling.
Figure 3:
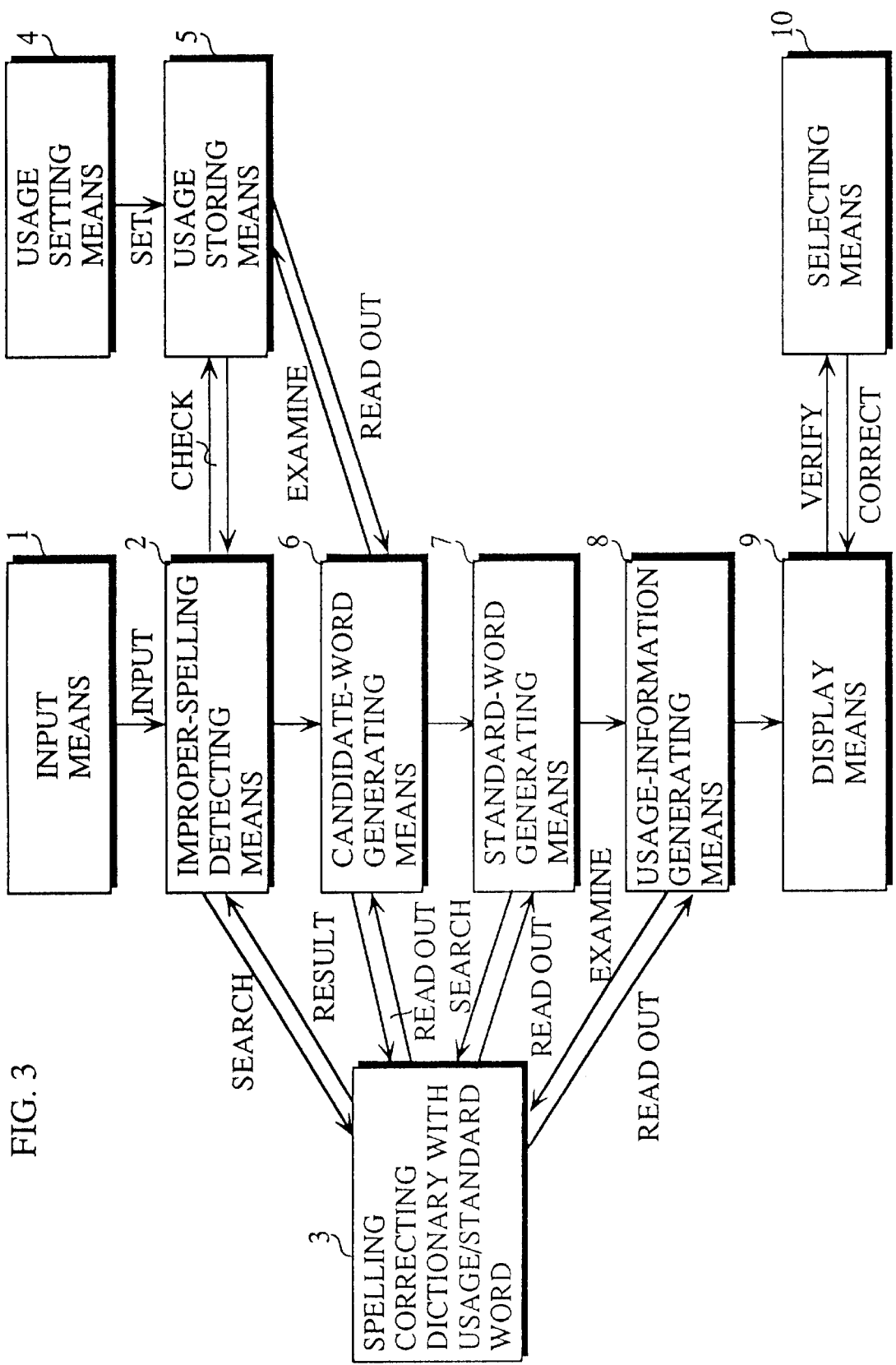
FIG. 3 is a block diagram of an apparatus for correcting the improper spelling and improper usage of a word according to a first embodiment of the present invention.

FIG. 3 is a block diagram of an apparatus for correcting the improper spelling and improper usage of an English word according to a first embodiment of the present invention. The words attached to the lines connecting the individual blocks are for describing the contents of the inter-block operation.

The apparatus for correcting the improper spelling and improper usage of an English word comprises an input means 1, an improper-spelling detecting means 2, a spelling correcting dictionary with usage/standard word 3, a usage setting means 4, a usage storing means 5, a candidate-word generating means 6, a standard-word generating means 7, a usage-information generating means 8, a display means 9, and a selecting means 10.

Information on the spelling of frequently misspelled words, information on the usages of the individual words, and, if any, the standard words corresponding to the individual words, are preliminarily stored in the spelling correcting dictionary with usage/standard word 3. Here, the "standard word" is defined as a word which can be used in any text. The information on the correct spelling of words and on the usages of the individual words used in the present specification is published in any rather detailed English dictionary. That is, a rather detailed English-Japanese dictionary or English-German dictionary shows for each word its special usages along with its slang, vulgar, and American usages. If the word takes special forms depending on the context in which it is used, such as the conjugation of an irregular verb, a symbol or an abbreviation may be attached to the word so as to characterize the word or a comment is made on the word to attract the attention of the searcher. In principle, the present embodiment will extensively use the information published in such dictionaries. However, a word less frequently used except a vulgar word or a slang is not stored for the purpose of saving storage equipment. The input means 1 includes a keyboard to which the operator inputs a sentence or a word. The operator preliminarily sets the usage of the whole inputted sentence by the usage setting means 4.

The improper-spelling detecting means 2 detects an improperly used word contained in the sentence inputted to the input means 1. These words are improperly used because quite a few words in each language have spelling which does not coincide with their pronunciations. Moreover, the relationship between the pronunciation and spelling of a word is often beyond the understanding of a non-native speaker of the language. As a result, each language has a large number of words which are frequently misspelled by a non-native speaker of the language if he tries to spell the words based on their sounds. In English, "length," "lengthen," "leisure," and the like correspond to these words. In the words mentioned above, "g" is not pronounced at all and "e" is pronounced like another vowel.

The present embodiment will detect a mistake resulting from the mismatching of its pronunciation and spelling. The present embodiment will detect not only a misspelled word but also an improperly spelled word by referring to the usage set by the usage setting means 4 and to the spelling correcting dictionary with usage/standard word 3. In this case, in addition to a misspelled word, a correctly spelled word the usage of which does not match a predetermined one is also detected as an improperly spelled word. As for the usages, they will be described later.

FIG. 4 shows an example of the content of the spelling correcting dictionary with usage/standard word 3. In the drawing, the bit sequences in the usage columns for the individual words correspond to British usage, American usage, Canadian usage, Scottish usage, Irish usage, Indian usage, Australian usage, written usage, colloquial usage, slang usage, vulgar usage, poetic usage, dialectal usage, and rare usage. The standard-word columns show the standard words corresponding to the individual words.

For example, the "centre" in the drawing is a British usage and its corresponding bit sequence is "10000000000000," while the standard word thereof is "center." The "ain't" is a slang and its corresponding bit sequence is "00000000010000," while the standard word thereof is "am not." A word which is suitable for any usage including a standard usage, such as "free," or an acronym such as "ECC" or "CPU" is represented by "11111111111111," and hence, it has no corresponding standard word.

FIG. 5 shows an example of the usages set by the usage setting means 4. The setting panel shown in FIG. 5 is at the initial stage, so that only the standard usage is selected. If the "all" button is pressed, all the usages are set. The operator is expected to specify a usage for correction on the setting panel displayed on the screen by using a mouse or keyboard.

Specifically, in the case where the operator preliminarily sets a usage for an inputted sentence by the usage setting means 4, if he requests an English usage and a vulgar usage to be adopted, he presses the "ENGLISH" and "VULGAR" buttons on the setting panel displayed on the screen of the drawing, so that the usage storing means 5 stores the types of usages specified with the usage setting means 4. In this case, "10000000010000" is stored as information on usages in the usage storing means 5.

The candidate-word generating means 6 generates a correct candidate word for an improperly spelled word. The candidate-word generating means 6 generates candidate words for the correct spelling of an improperly spelled word, while judging whether or not the values of the bits which represent the information on the usages stored in the usage storing means 5 match the values of the bits attached to the individual words in the spelling correcting dictionary with usage/standard word 3. Consequently, only candidate words suitable for the usages currently set can be obtained.

If an improperly spelled word has the corresponding standard word in the spelling correcting dictionary with usage/standard word 3, the standard-word generating means 7 generates the standard word for the improperly spelled word. As shown in FIG. 4, the standard words for the individual words are described in the spelling correcting dictionary with usage/standard word 3. The usage-information generating means 8 generates information on the usages of the improperly spelled word and of its candidate words by referring to the spelling correcting dictionary with usage/standard word 3.

FIG. 6 shows an example of the screen displaying information on the improperly spelled word, its candidate words, and their usages.

The labels such as "VULGAR," "STANDARD," and "WRITTEN" in the drawing represent information on the usages of the individual words. If no usage information is displayed for a word, the word is suitable for any usage. These labels will be described later in greater detail. The display means 9 is for displaying an improperly spelled word detected by the improper-spelling detecting means 2 and its candidate words or standard word generated by the candidate-word generating means 6 or standard-word generating means 7, along with the information on the usage generated by the usage-information generating means 8. The display means 9, which has a CRT for display, also displays the text being produced. The selecting means 10 is for the operator to select from the candidate words an intended one, so that it has a mouse and a keyboard used for this purpose. The improper-spelling detecting means 2, usage setting means 4, candidate-word generating means 6, standard-word generating means 7, and usage-information generating means 8 are incorporated in a CPU with a program. The spelling correcting dictionary with usage/standard word 3 is composed of a ROM and a RAM. The usage storing means 5 is composed of a RAM.

Figure 7:
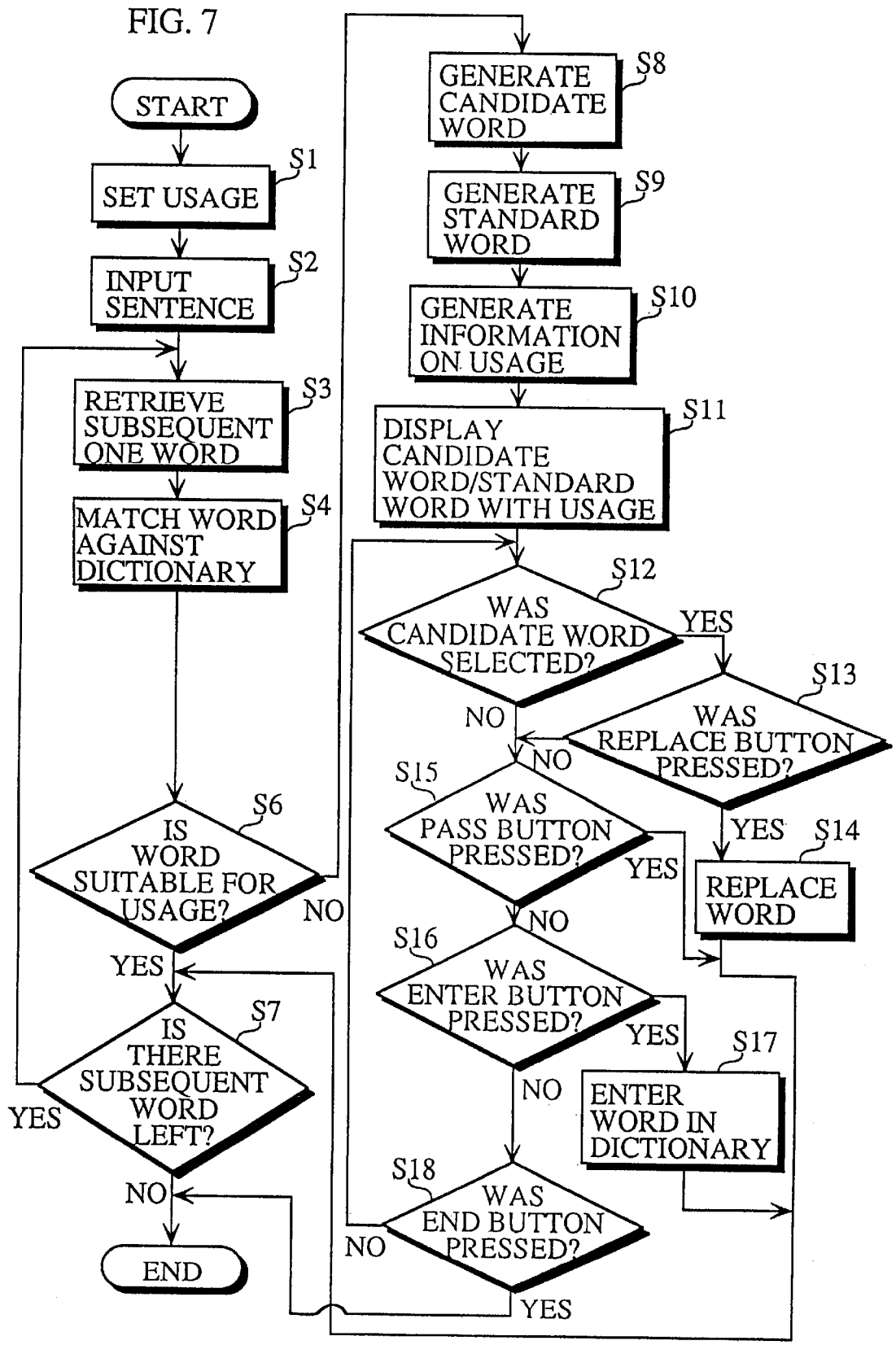
FIG. 7 is a flow chart showing the operation of the apparatus for correcting the improper spelling and improper usage of a word according to the first embodiment of the present invention.

The operation of the foregoing apparatus for correcting the improper spelling and improper usage of a word will be described with reference to the flow chart of FIG. 7.

First, the operator sets an objective usage by the usage setting means 4 (Step S1), so that the selected usage is stored in the usage storing means 5. Next, if the operator inputs a sentence or a word by the input means 1 (Step S2), the improper-spelling detecting means 2 retrieves the first word of the inputted sentence, i.e., the first string of characters inputted as a word (Step S3), so as to judge whether or not the word is correctly spelled. The character string is recognized as such based on the space present between characters. To check the spelling, the improper-spelling detecting means 2 performs the matching of an inputted word against the spelling correcting dictionary with usage/standard word 3 (Step S4). The improper spelling on misspelling detecting means 2 judges whether or not the usage of the inputted word is suitable for the usage stored in the usage storing means 5 (Step S6). The information on the usages of the individual words is described in the spelling correcting dictionary with usage/standard word 3 (see FIG. 4). If the usage of the inputted word is suitable, the improper-spelling detecting means 2 judges that the inputted word in question is not improperly spelled, and then checks the subsequent word (Step S7). If there is no subsequent word, the process of correcting the improper spelling is completed. If there is any subsequent word, the process returns to Step S3.

If there is a possible matching word in the dictionary in Step S5 or if the usage of the inputted word is not suitable in Step S6, it is judged that the inputted word has a possibility of being improperly spelled so that the candidate-word generating means 6 generates candidate words for the correct spelling of the improperly spelled word by referring to the spelling correcting dictionary with usage/standard word 3 (Step S8). In this case, the candidate-word generating means 6 searches the spelling correcting dictionary with usage/standard word 3 for the inputted word which was judged to be a potential improperly spelled word by referring to information on the usage previously set in the usage storing means 5, thereby generating only candidate words that can be used in the usage. As a result, only candidate words suitable for information on the usage currently set can be obtained, so that a more suitable candidate word is selected.

Since the inputted word is English, which is an European language consisting of Roman letters, the possibility that generated candidate words having similar spelling include a synonym is extremely high by nature. Consequently, only candidate words suitable for the usage can be obtained.

Subsequently, the standard-word generating means 7 refers to the spelling correcting dictionary with usage/standard word 3, and if the standard word of the improperly spelled word exists therein, generates the standard word (Step S9). Then, the usage-information generating means 8 generates information on the usages of the improperly spelled word and its candidate words (Step S10). Next, the display means 9 presents the improperly spelled word, its candidate words, and its standard word obtained in the foregoing process, along with their usages, to the operator as shown in FIG. 6 (Step S11). The operator then selects, using the selecting means 10, a candidate word which seems to be correct by referring to the usage information, standard word, and the like.

By way of example, FIG. 6 shows a case where the usage preliminarily set by the operator using the usage setting means 4 is "WRITTEN" among the usages shown in FIG. 5 and where the word "delish," which is a slang, exists in the inputted sentence. In this case, "delish" is displayed as a correctly but improperly spelled word for the reason shown above. As a candidate word for the correct usage, "delicious" is presented as the equivalent standard word. Also presented is "deliverance," which is a written word having similar spelling and "delist," "deliver," and "delict," which are suitable for the written usage and have similar spelling. Here, the operator selects "delicious" as a synonym of "delish" by means of a mouse or keyboard.

Subsequently, it is judged whether or not the operator selected any candidate word (Step S12). If the answer is YES, it is further judged whether or not the "REPLACE" button was pressed (Step S13). If the "REPLACE" button was pressed, the word "delish" in the inputted sentence is replaced with is "delicious" (Step S14), thereby returning to Step S7 so as to check the subsequent word. It is possible to select another candidate word if the "REPLACE" button is not pressed yet.

If the candidate words do not include a proper word, i.e., a word intended by the operator, the operator presses the "PASS" button. In other words, if no candidate word was selected in Step S12 or if the "REPLACE" button was not pressed in Step S13, it is judged whether or not the "PASS" button was pressed (Step S15). If the answer is YES, the process goes on to check the subsequent word without correcting the spelling of the word in question.

If the word judged to have a possibility of being improperly spelled turned out to be a correctly spelled proper noun such as a person's name, the word can be entered in a user dictionary (not shown). That is, if the "PASS" button is not pressed in Step S15, it is judged whether or not the "ENTER" button was pressed (Step S16). If the "ENTER" button is pressed in Step S16, the inputted word is entered into the user dictionary (Step S17), thereby returning to Step S7 so as to process the subsequent word. In this case, it is also possible for the operator to enter information on the usage and standard word of the inputted word, along with the inputted word itself, in the user dictionary. If the "ENTER" button is not pressed in Step S16, it is judged whether or not the operator pressed the "END" button (Step S18). If the "END" button was not pressed, the process returns to Step S12 so as to continue the process of selecting candidate words. If the "END" button was pressed, the process of correcting improper spelling is completed.

Although an improper spelling and improper usage of a word are corrected in the same step sequence (S8 to S18) in the present embodiment, they may be corrected in different step sequences.

Instead of entering, in the user dictionary, information indicating that the inputted word is not misspelled, it is also possible to attach, to the corresponding spelling in the spelling correcting dictionary with usage/standard word 3, a mark indicating that the inputted word is not misspelled.

Although the present embodiment has shown British usage, American usage, and the like because English language has been taken as an example, it will be appreciated that, if another language such as German is taken as an example, usages corresponding to the language, such as High-German usage and Low-German usage, will be shown instead.

Second Embodiment

Figure 8:
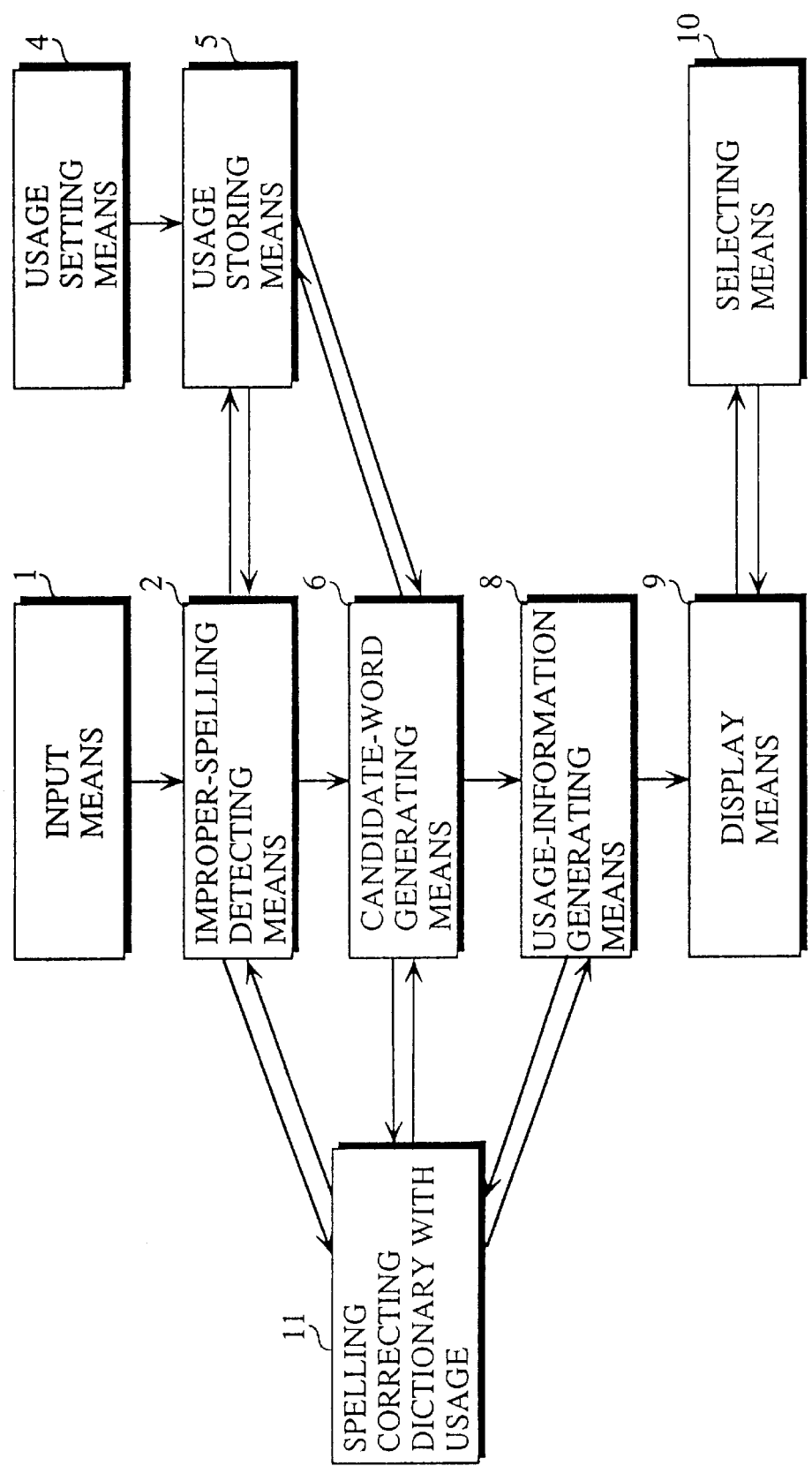
FIG. 8 is a block diagram showing another embodiment of the apparatus for correcting the improper spelling and improper usage of a word according to the present invention.

FIG. 8 is a block diagram of the apparatus for correcting the improper spelling and improper usage of a word according to another embodiment of the present invention. Below, the structure and operation of the present embodiment will be described with reference to the drawing. The present embodiment is primarily different from the first embodiment in that the spelling correcting dictionary with usage/standard word and standard-word generating means are not provided and that a spelling correcting dictionary with usage 11 is provided instead. Accordingly, the standard word corresponding to an improperly spelled word is not generated.

As for the components having the same structures and actions as the corresponding components in the first embodiment, the description thereof will be basically omitted by providing like reference numerals. The present embodiment will also make extensive use of the drawings in the first embodiment, provided that the situation permits.

Below, a description will be given to the intrinsic structure and action of the present invention.

The improper-spelling detecting means 2 detects the improper spelling of each word contained in a sentence inputted to the input means 1 by referring to the usage set by the usage setting means 4 and to the spelling correcting dictionary with usage 11. In this case, a correctly spelled word the usage of which does not match the usage currently set, the word is also detected as an improperly spelled word, let alone a misspelled word. On the other hand, the spelling correcting dictionary with usage 11 stores information on the spelling of words. To each word is attached information on its usage.

FIG. 9 shows an example of the spelling correcting dictionary with usage 11. The bit sequences in the individual usage columns of the drawing correspond to British usage, American usage, Canadian usage, Scottish usage, Irish usage, Indian usage, Australian usage, written usage, colloquial usage, slang usage, vulgar usage, poetic usage, dialectal usage, and rare usage, similarly to the first embodiment.

If the word is suitable for British usage, it is represented by "1000000000000." If the word is suitable for standard usage and all the other usages, it is represented by "1111111111111."

FIG. 5 shows an example of the usage-setting means 4, which is the same as used in the first embodiment and hence is used extensively in the present embodiment. Accordingly, by pressing the "BRITISH" and "SLANG" buttons, "1000000010000" is stored as usage information in the usage storing means 5.

The candidate-word generating means 6 generates candidate words for the correct spelling of an improperly spelled word. Since the candidate-word generating means 6 generates candidate words by referring to the content of the usage storing means 5 and to the spelling correcting dictionary with usage 11, only candidates suitable for the usage currently set can be obtained. The usage-information generating means 8 generates information on the usages of the improperly spelled word and its candidate words by referring to the spelling correcting dictionary with usage 11.

Figure 10:
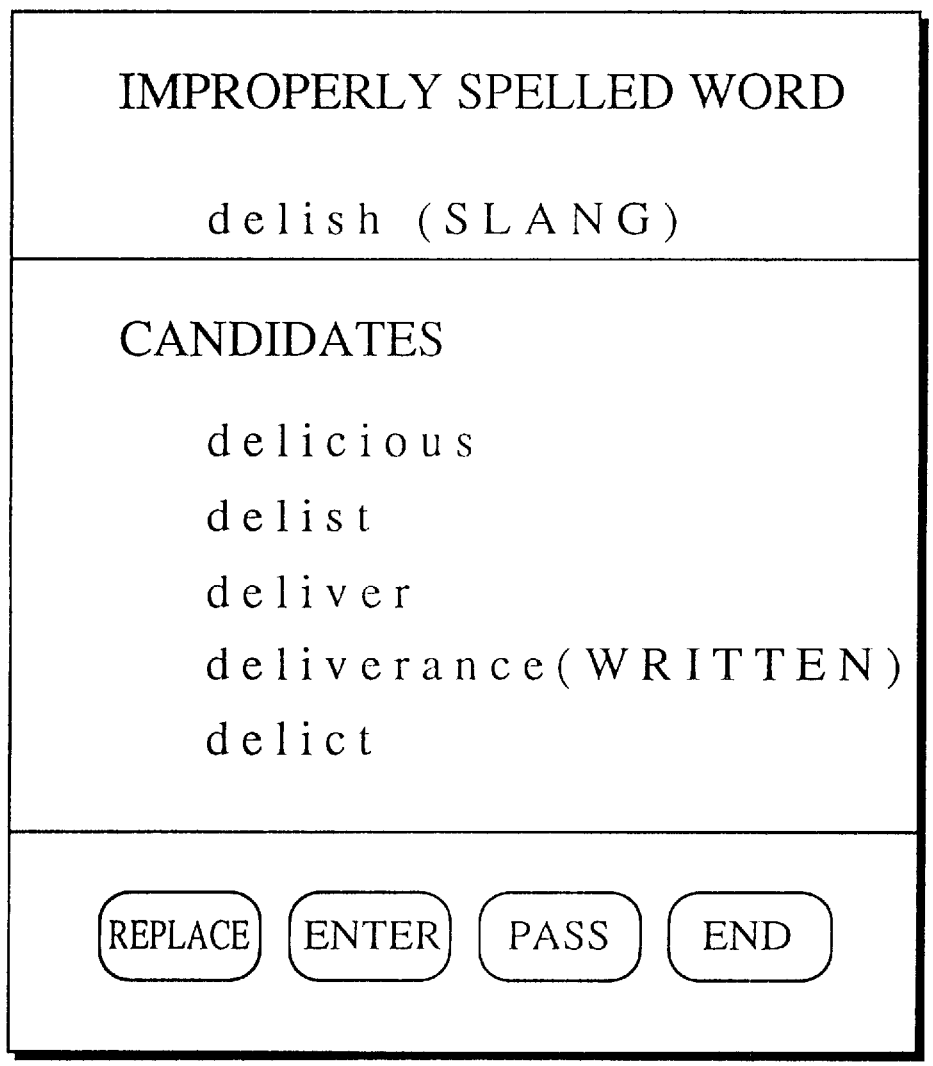
FIG. 10 is a view showing the screen for selecting a candidate word being displayed of the apparatus for correcting the improper spelling and improper usage of a word in the above embodiment.

FIG. 10 shows an example of the screen for selecting among the candidate words being displayed.

In the drawing, labels such as "SLANG" and "WRITTEN" represent information on the usages of each word. A word with no label indicates that it is suitable for any usage.

The display means 9 displays an improperly spelled word detected by the improper-spelling detecting means 2 and a candidate word generated by the candidate-word generating means 6, along with information on their usages generated by the usage-information generating means 8. The selecting means 10 is for the operator to select any of the candidate words being displayed. The spelling correcting dictionary with usage 11 consists of a ROM and a RAM.

Figure 11:
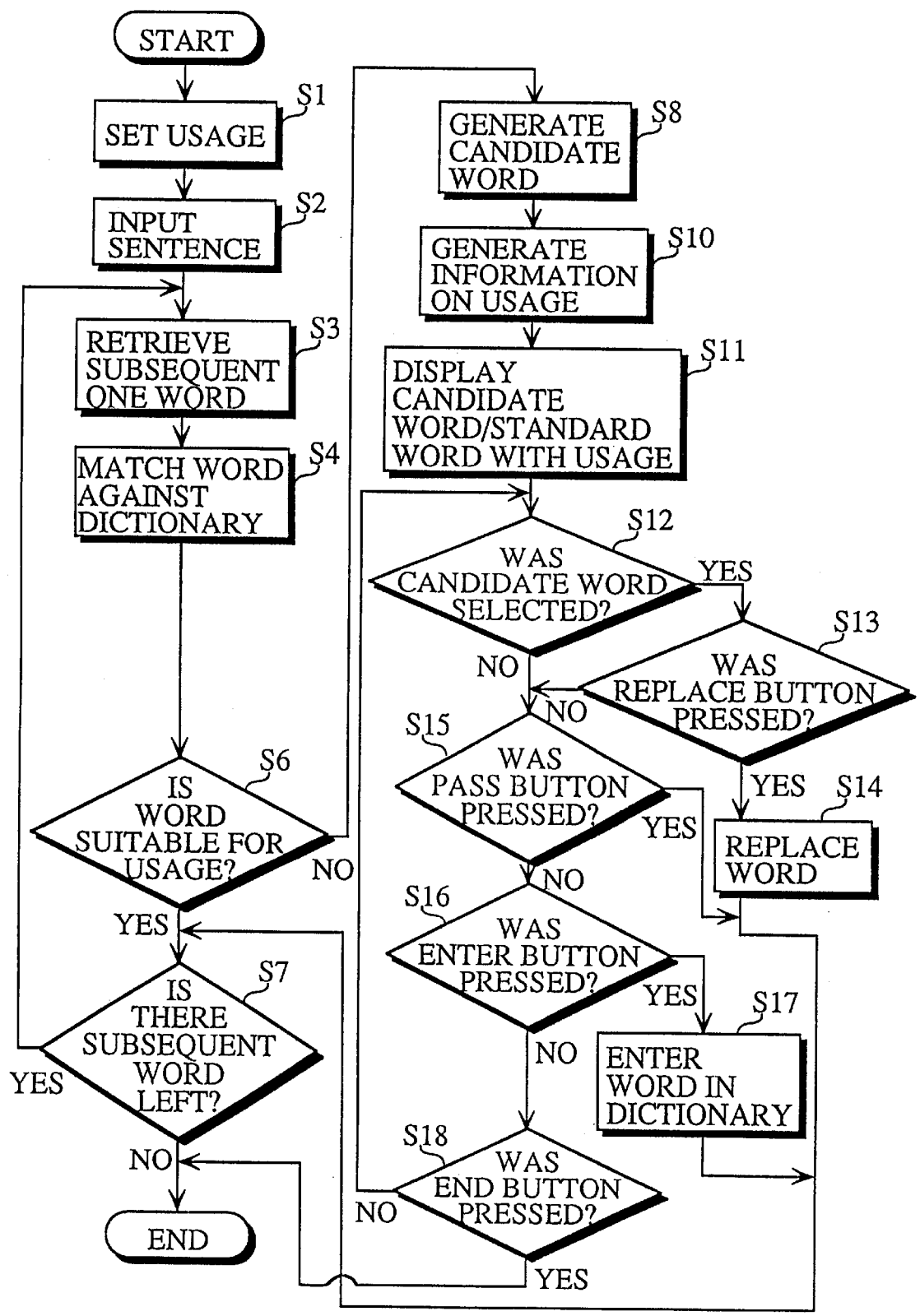
FIG. 11 is a flow chart showing the operation of still another embodiment of the apparatus for correcting the improper spelling and improper usage of a word according to the present invention.

Next, the operation of correcting the improper spelling and usage of a word will be described with reference to the flow chart of FIG. 11, by emphasizing the intrinsic operation thereof.

The procedures performed in Steps S1, S2, and S3 are the same as those performed in the first embodiment. The improper-spelling detecting means 2 performs the matching of the inputted word against the spelling correcting dictionary with usage 11 (Step S4). The improper-spelling detecting means 2 judges whether or not the usage of the word matches the usage stored by the usage-storing means 5 (Step S6). The information on the usages of the individual words is described in the spelling correcting dictionary with usage 11 (see FIG. 9). If the usage of the word matches, it is judged that the inputted word is not improperly spelled, thereby checking the subsequent word (Step S7). If there is no subsequent word, the process of correcting improper spelling is completed. If there is any subsequent word, the process returns to Step S3.

The procedure performed in Step S8 is the same as that performed in the first embodiment. However, the step corresponding to Step S9 of the first embodiment does not exist in the present embodiment, for different components are used here.

Next, the usage-information generating means 8 generates information on the usages of the improperly spelled word and its candidate words by referring to the spelling correcting dictionary with usage 11 (Step S10). Next, the display means 9 presents to the operator the improperly spelled word and its candidate words along with the information on their usages obtained in the foregoing process, as shown in FIG. 10 (Step S11). Then, the operator selects, using the selecting means 10, a candidate word which seems to be correct by referring to the information usage.

By way of example, FIG. 10 shows a case where the usage preliminarily set by the operator using the usage setting means 4 is "WRITTEN" among the usages shown in FIG. 5 and the word "delish," which is a slang, is contained in the inputted sentence. In this case also, "delicious" will be selected, similarly to the first embodiment.

The procedures performed in Steps S12, S13, S14, S15, S16, S17, and S18 are the same as those performed in the first embodiment.

Third Embodiment

Figure 12:
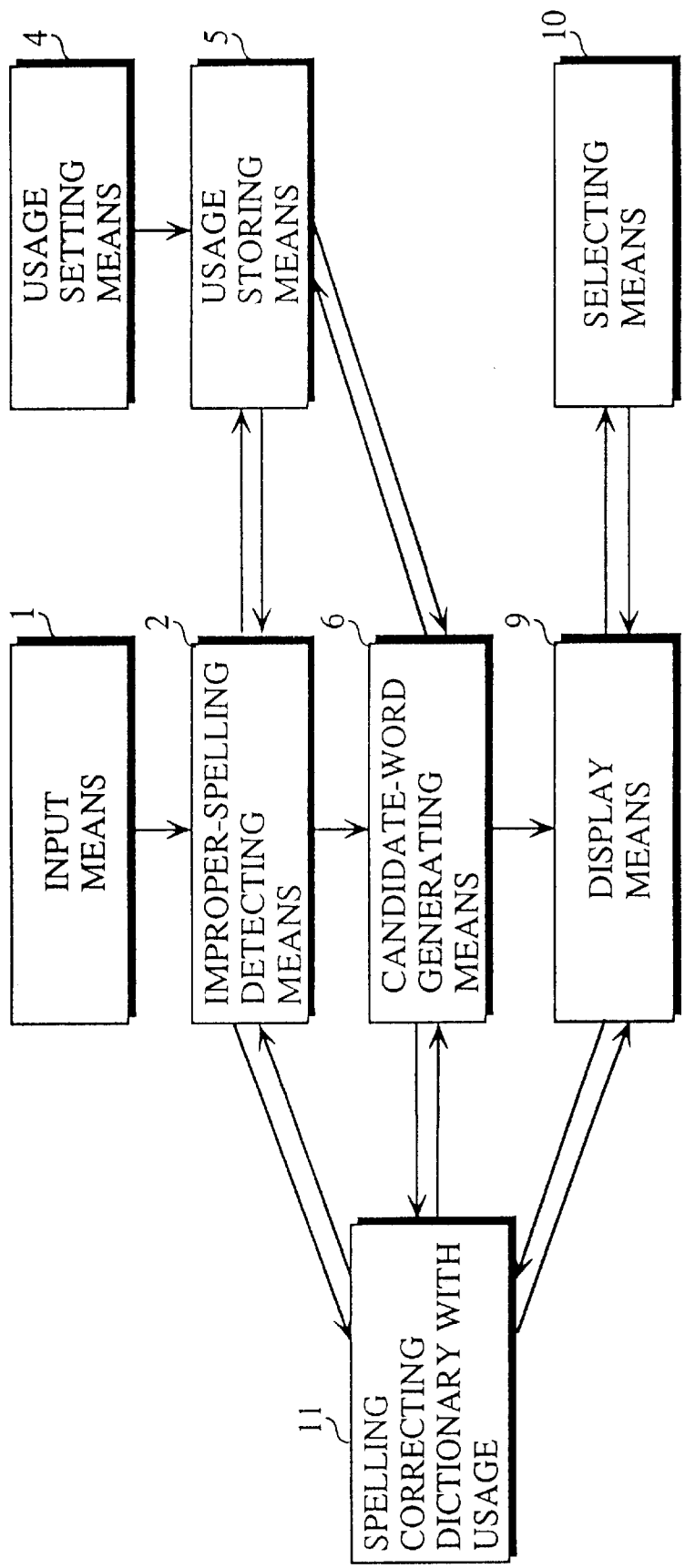
FIG. 12 is a block diagram of still another embodiment of the apparatus for correcting the improper spelling and improper usage of a word according to the present invention.

FIG. 12 is a block diagram of the apparatus for correcting the improper spelling and improper usage of a word according to a third embodiment of the present invention. The present embodiment is different from the second embodiment in that the usage-information generating means 8 does not exist. Below, the structure and operation of the present embodiment will be described with reference to FIG. 12. The apparatus for correcting the improper spelling and improper usage of a word of the present embodiment comprises the input means 1, improper-spelling detecting means 2, spelling correcting dictionary with usage 11, usage setting means 4, usage storing means 5, candidate-word generating means 6, display means 9, and selecting means 10. As for the components having the same structures and actions as the corresponding components in the foregoing second embodiment, the description thereof will be basically omitted by providing like reference numerals.

The actions of the input means 1, improper-spelling detecting means 2, usage setting means 4, and spelling correcting dictionary with usage 11 are the same as those of the second embodiment.

The content of the spelling correcting dictionary with usage 11 and the usage previously set by the usage-setting means 5 are also the same as those of the second embodiment, so that FIGS. 9 and 5 will be used extensively in the present embodiment.

Accordingly, by selecting the "BRITISH" button and "VULGAR" button, "10000000010000" will be stored as usage information in the usage storing means 5.

Since the candidate-word generating means generates a candidate word by referring to the content of the usage storing means 5 and to the spelling correcting dictionary with usage 11, only candidates suitable for the usage currently set can be obtained.

Figure 13:
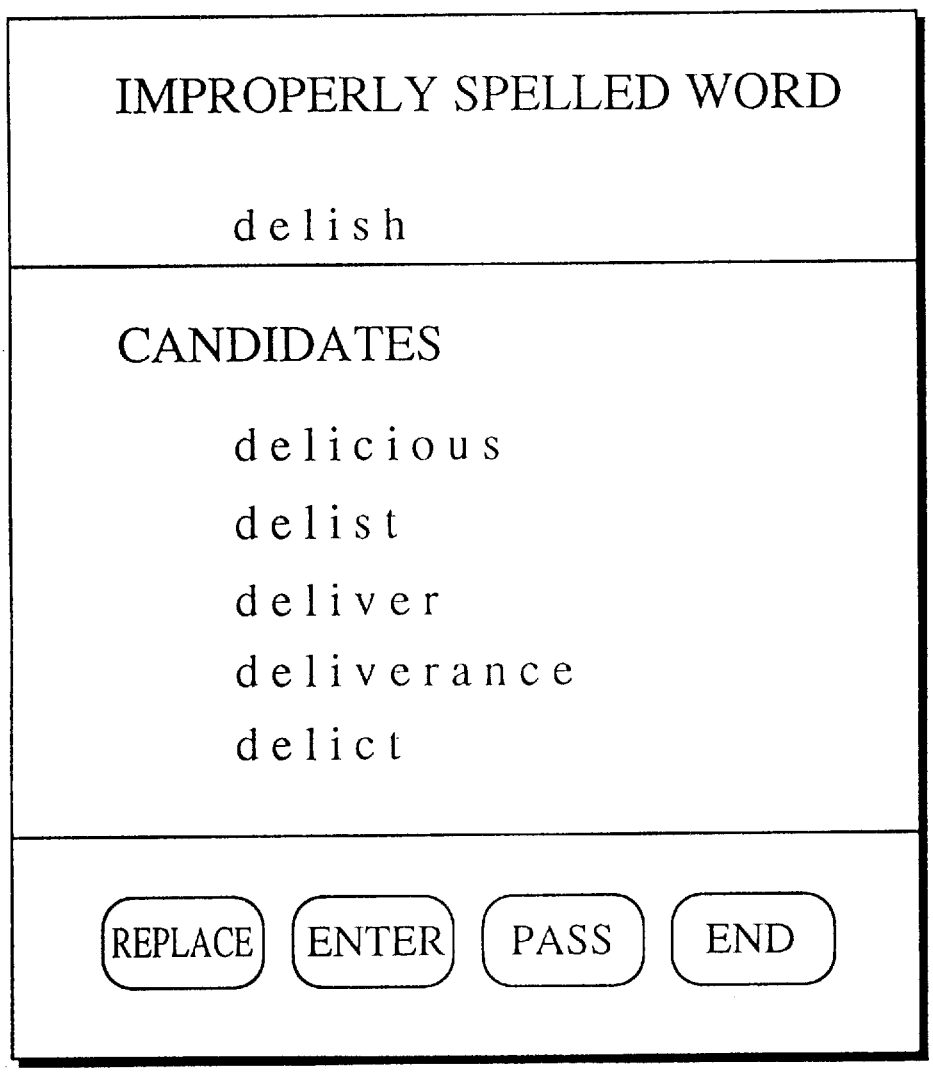
FIG. 13 is a view showing the screen for selecting a candidate word of still another embodiment of the apparatus for correcting the improper spelling and improper usage of a word.

FIG. 13 shows an example of the screen for selecting among the candidate words being displayed.

The display means 9 and selecting means 10 also perform the same actions and operations as those performed in the second embodiment.

Figure 14:
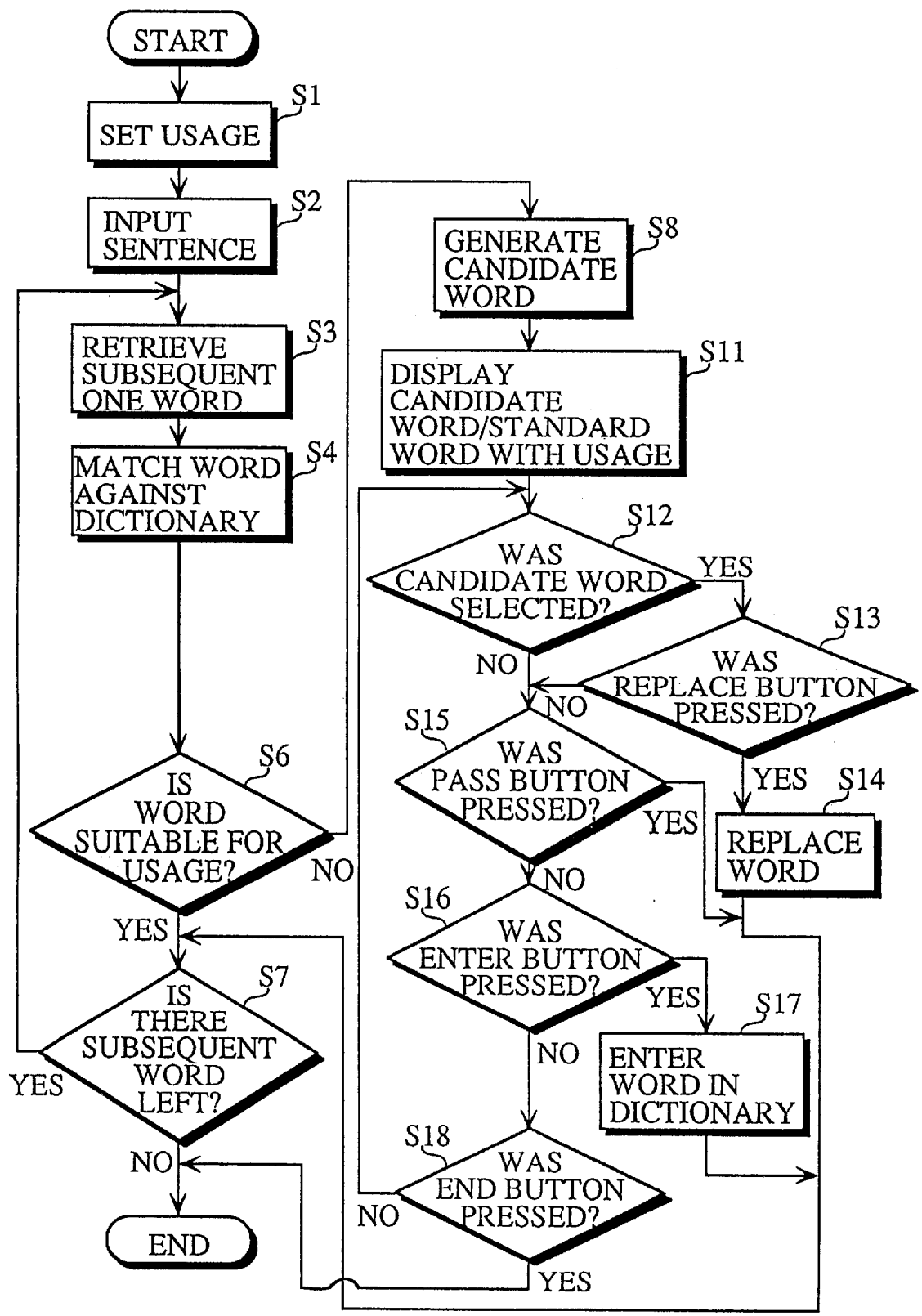

Next, the operation of the present embodiment will be described with reference to the flow chart of FIG. 14, by emphasizing the intrinsic operation thereof.

The procedures performed in Steps S1, S2, and S3 are the same as those performed in the foregoing first and second embodiments.

The procedures performed in Steps S4, S5, S6, S7, and S8 are the same as those performed in the foregoing second embodiment.

Next, the display means 9 presents the improperly spelled word and its candidate words, obtained in the foregoing process, to the operator by displaying them as shown in FIG. 13 (Step S11). Then, the operator selects a candidate word which seems to be correct using the selecting means 10. For example, by monitoring the display shown in FIG. 13, the operator selects the intended word (e.g., "delicious") using a mouse or keyboard.

The procedures performed in Steps S12, S13, S14, S15, S16, S17, and S18 are also the same as those performed in the second embodiment.

Fourth Embodiment

FIGS. 15A, 15B, and 15C are views showing the structure and flow of operations intrinsic to another embodiment of the apparatus for correcting the improper spelling and usage of a word according to the present invention.

The present embodiment was obtained by providing the foregoing first embodiment with an additional component and means for performing functions dedicated to the correction of the improper spelling and usage of a word, which are frequently caused by a Japanese in inputting a document in English.

That is, an English-misspelling judging unit for Japanese 31 shown in FIG. 15A and an incorrect-English-usage judging unit for Japanese 32 shown in FIG. 15B are added to the spelling correcting dictionary with usage/standard word 3 in FIG. 3. In addition to that, the improper-spelling detecting means 2, candidate-word generating means 6, and standard-word generating means 7 are provided so as to perform required functions. The structures and actions of the other components are the same as those of the first embodiment, so that the description thereof will be omitted.

In the English-misspelling judging unit for Japanese 31 are arranged the spellings of words which are frequently misspelled in accordance with the causes of misspelling. As shown in FIG. 15A, the English-misspelling judging unit for Japanese 31 consists of an L-R judging element, an OR-ER judging element, an S-TH judging element, a V-B judging element, a C-K judging element, and the like. In the L-R judging element is stored data for detecting misspelling resulting from difficulty in distinguishing between the L sound and the R sound. Specifically, if "mirror" and "miller" are taken as examples, "mirror" corresponds to its Japanese equivalent " 鏡 " while the "miller" corresponds to its Japanese equivalent " 粉屋 " so that the two pairs of English and Japanese words are retrieved in combination and displayed, if required. The OR-ER judging element displays the pair of "mirror" and " 粉屋 " the pair of "mirrer" and " 該当する英単語なし (NO JAPANESE EQUIVALENT)," and the like in combination.

Likewise, such pairs of "sink" and its Japanese equivalent " 沈む " and "think" and its Japanese equivalent " 考える " are stored in the S-TH judging element so that they can be retrieved and displayed in combination, while such pairs of "curb" and its Japanese equivalent " 止め輪 " and "curve" and it Japanese equivalent " 曲線 " are stored in the V-B judging element so that they are retrieved and displayed in combination. In the present embodiment, however, only words which are most frequently misspelled are stored, unlike a dictionary.

As shown in FIG. 15B, the incorrect-English-usage judging unit 32 stores initially, as one of the causes of misspelling when a Japanese prepares an English document, words which are considered by most Japanese to be loan words from English but are actually not.

Specifically, a Japanized-English judging element and a non-English-loan-word judging element perform the above operation. The Japanized-English-judging element stores a pair of a 'forgery' expression consisting of English words, which was coined and has been used in Japan but is not used in any English-speaking country, and an English expression equivalent to the 'forgery' expression. The 'forgery' expression is written in Kata-kana letters, which is a type of Japanese characters. For example, "back mirror," which is a Japanized English expression, " バックミラー " and "rear-view mirror," which is its English equivalent, are stored in combination.

The non-English-loan-word judging element stores a Japanized word, which most Japanese think originates from English but actually originates from another language, in combination with the word in Kata-kana letters and its meaning, an English word equivalent to the word in Kata-kana letters, a Japanese comment meaning "a Japanized word originating from _____" (in the blank _____ is filled the name of a language from which the word originates, such as French or German), and the English equivalent of the word.

As a specific example, "Ente ( エンテ 先尾翼 which is a Japanized German word)" and its English equivalent "canard" are stored in combination.

Next, a description will be given to other elements.

In the irregular-verb judging element is entered irregular verbs, the conjugations of which are often misused by a Japanese because of their high frequency of use and similarity in sounds, in combination with the misspelling frequently produced of the words, the Japanese meanings of the words, and the like. As a specific example, "lay, laid, laid ( 置く)" and "lie, lay, lain ( 横たわる)" are entered in pairs.

The improperly-used-word judging element stores pairs of words, which are frequently confused by a Japanese because of their similarity in spelling and which are frequently used, in combination with their corresponding Japanese words.

As a specific example, "steal ( 盗む), steel ( 鉄 )" are stored therein.

The reasons why the present embodiment has adopted only frequently used words are as follows: First, they can be fully accommodated in a compact disk; Second, if a non-native speaker of a certain language made a mistake in using a less frequently used word, he would not be considered as discourteous; Third, the resulting compact disk will be practical and available at low price. As a result, such data like the content of a dictionary is produced integrally with a program required to perform its function and stored in a detachable memory in the form of a disk, which can easily be attached to the apparatus for correcting the improper spelling and usage of a word according to the first embodiment.

Next, the intrinsic operation of the present embodiment will be described with reference to the flow chart of FIG. 15C. The flow chart is to be interposed between Steps S3 and S4 of FIG. 7.

It is judged whether or not the word retrieved in Step S3 is stored in the English-misspelling judging unit for Japanese 31 (Step S41a), before proceeding to Step S4.

If it is stored, information stored in combination is displayed along with a blinking "NOTICE" sign in a predetermined position in the lower part of the CRT, in order to notify the operator of the result of judgment (Step S42a).

In response to the blinking display, if a specified operation of correcting and verifying and the like is performed, the blinking display is turned off (Step S43a).

If the word is not stored in the English-misspelling judging unit for Japanese 31 or if a specified operation of correcting and verifying is performed, it is examined whether or not the word is stored in the incorrect-English-usage judging unit for Japanese 32 (Step S41b).

If the word is stored in the incorrect-English-usage judging unit for Japanese 32, the stored information is displayed in conjunction with the blinking "NOTICE" sign in a predetermined position of the lower part of the CRT Stop S42b).

If the subsequent word is inputted, which indirectly indicates that a specified operation of correcting and verifying was properly performed and inputted for the word in question (Step S43b), the process goes on to Step S4.

If the word to be retrieved is not stored in the incorrect-English-usage judging unit for Japanese 32, the process goes on to Step S4.

Although the present embodiment has described the structure and action for detecting and correcting words which are likely to be misspelled or improperly used in the case where a Japanese prepares a document in English, it will be appreciated that, if a German prepares a document in English, similar effects can be obtained by inserting a disk produced for a German on which an English-misspelling judging unit and incorrect-English-usage judging unit are mounted, instead of the disk produced for a Japanese.

Mistakes often made by Germans in using an English word are:

(1) Considering, by mistake, a Germanized French word or a German-made English word as a word originating from English.

(2) Confusing the gender of a word with another, which has the same meaning both in English and German but has different genders in English and in German, so that "he," "she," and "it" are misused.

(3) Starting a noun by a capital letter, which is mandatory in German language, although the head letter of an English noun is usually small except when it is placed at the head of a sentence.

(4) Misspelling a word due to the different sounds used to pronounce a character, such as "S," in English and in German.

(5) Confusing one character with the other which have the same or a similar sound in German but have different sounds in English, such as "V" and "W."

(6) Using an umlaut in English, which is used in German but not used in English.

If a British man produces a document in German, on the other hand, he often has difficulty in understanding a reflexive verb, which is used in, e.g., "Ich erkälte mich," which means "I take cold" in English. Therefore, the function of notifying the operator of the presence of a reflexive verb, such as "erkälten," when it is inputted, will be added.

If a British man inputs a Northern-European language, a consideration is given to different sounds used to pronounce "G" (in a Northern-European language, "G" is pronounced like "Y") in both languages.

Fifth Embodiment

The present embodiment relates to preventing the misuse of the confusing nominal genders of masculine, feminine, and neuter. The present embodiment was obtained by providing an additional device in the apparatus for correcting the improper spelling and improper usage of a word according to the first embodiment.

European languages including English and German, in particular, have the nominal genders of masculine, feminine, and neuter. With the nominal genders, pronouns, verbs, adverbs, articles, and the like take various forms according to complicated rules. Such rules are difficult to understand not only by Europeans, but also by people belonging to another language group (family of language), such as Japanese and Chinese, in particular. Specifically, "ship" has the feminine gender even if it is a battleship, while a Japanese word equivalent to "ship" has the neuter gender and hence is treated as an object.

In view of the foregoing, the present embodiment was obtained by adding, to the display means of the first embodiment (FIG. 3), a nominal-gender dictionary 161 in which frequently used nouns of an European language to be inputted are entered and a visual-gender-display control means 162 for controlling the display means so that a masculine noun is displayed in blue, a feminine noun is displayed in red, and a neuter noun is displayed in white, thereby enabling the visual recognition of the genders, as shown in FIG. 16A.

Since the target language is English, the nominal-gender dictionary 161 stores only words which are likely to be misused by a Japanese, such as "ship," as shown in FIG. 16A.

When a direction to perform a function is given by the user to the visual-gender-display control means 162, the visual-gender-display control means 162 controls the display means 9 so that it displays, by referring to the nominal-gender dictionary 161, the masculine nouns, feminine nouns, and neuter nouns contained in the document being prepared on the CRT in blue, red, and white, respectively.

The flow of operation is shown in FIG. 16B. The flow shows a process of displaying, in preparing a document, nominal genders so that they are visually distinguished from each other. Whether or not the inputted sentence has come to the end is judged based on the inputting of ".," "?," and "!," each of which indicate the end of a sentence.

Thus, a proper noun indicating a foreign person's name is prevented from being misused.

Although the nominal-gender dictionary 161 stores only words which are frequently misused by a Japanese in the case where an English document is prepared, if a German document is prepared instead, a large number of nouns, such as "Aal" and "Aap" will be stored in alphabetical order, thereby preventing the misuse of the gender of a foreign person's name.

Specifically, the present embodiment assists not only a Japanese and a Chinese but also a British man in the preparation of a German document so that they can properly use such articles as "der," "des," and "den" and verbal conjugations.

The present embodiment can also be used extensively to assist a Japanese or Chinese in the preparation of an English text so that he can selectively use a singular form or a plural form for a person or a noun, such as "man" or "men," which is basically not required in Japanese and Chinese languages and that he can properly use such articles as "is," "an," etc.

Sixth Embodiment

The present embodiment will describe the case where a Chinese or an European prepares a Japanese document. Since the basic structure and idea are the same as those used in the preceding embodiment, only intrinsic technical aspects will be described.

(1) In Japanese, it is common to write a Japanized word which originates from an European language in Kata-kana letters. For example, "facsimile" and "raincoat" are "ファクシミリ" and "レインコート" not "ふぁくしみり" and "れいんこーと" However, for a non-native speaker of Japanese, it is difficult to recognize an European loan word in a Japanese text. Therefore, if such words are entered in a Japanese-incorrect-usage judging unit for a foreigner, the misuse of Kata-kana letters and Hira-kana letters in displaying such words can be prevented. This is extremely effective when a person belonging to a language group other than an European language and a Japanese language, such as a Chinese or a Malay, produces a Japanese document.

(2) In Japanese, there are a large number of cases where words in written form do not coincide with their pronunciations, similarly to English.

For example, although "東京" is pronounced as "TOOKYOO" or "TOOKYOU," it is generally written as "とうきょう" in Kana letters and "TOKYO" in Roman letters. In this case, there are mismatches between "O" and its pronunciation and between "U" and its pronunciation.

In addition, "日本" is pronounced as "NIHON" or "NIPPON." Most Europeans have difficulty in recognizing the very sound of "H," which is frequently used in Japanese language. They also have difficulty in distinguishing the "H" sound from the "F" sound.

To solve the problem, an O-U judging element, a H-sound judging element, and a H-P judging element are provided, as the R-L judging element is provided in the case where a Japanese inputs an English sentence.

With these judging elements, if "TOKYOO" is inputted, "TOKYO" is also displayed. Whether "NIHON" or "NIP- PON" is inputted, " 日本 " is displayed. If "FUNE (ship)" is inputted, display for inquiring whether or not the operator initially intended to input "HUNE" is performed.

(3) Europeans are apt to making mistakes in reading and writing or inputting Chinese characters having configurations which are similar but different in details.

Examples of these Chinese characters are " 人 (man)" and " 入 (enter)" and " 鮒 (crucian)" and " 鯉 (carp)." Consequently, if such a confusing Chinese character is inputted by handwriting using a digitizer, the inputted Chinese character is displayed in combination with other Chinese characters, which are frequently confused with the inputted one, and their meanings in English. These Chinese characters are comparable to "lay, laid, laid ( 置く )" and to "lie, lay, lain ( 横たわる )."

(4) Some Chinese characters and words are used in both Chinese and Japanese, but have different meanings in Chinese and in Japanese. For example, " 鮎 " means sweetfish in Japanese, while it means catfish in Chinese. Consequently, if a chinese prepares a Japanese document, he is likely to make mistakes in using these Chinese characters and words. To solve the problem, a dictionary in which such Chinese characters and words are entered is provided, so that the dictionary is referred to when a Chinese character or word is inputted. If the inputted Chinese character or word has been entered in the dictionary, display is performed so as to notify the operator.

Although the present invention has described a plurality of embodiments thus far, it will be appreciated that the present invention is not limited to the foregoing embodiments. The following structures are also included in the scope of the present invention.

(1) The structure wherein, if the standard-word generating means refers to the spelling correcting dictionary with usage/standard word and detects a standard word corresponding to an improperly spelled word, the standard word is not generated as a synonym. Instead, synonyms for each word and each usage are also stored in the foregoing spelling correcting dictionary with usage/standard word, in addition to the information on their usages. In this case, if the improper-spelling detecting means detects an inputted word which is correctly spelled but is not suitable for the usage preliminarily set by the operator, the standard-word generating means refers to the above spelling correcting dictionary with usage/standard word and to the usage storing means, so as to retrieve words which are suitable for the preliminarily set usage and which have the same meaning or similar meanings, thereby generating the words as candidate words for the improperly spelled word.

(2) The structure wherein the information on usages and the standard words are described not in the same dictionary for correcting spelling, but in two independent dictionaries.

(3) The structure wherein the input means has a hand-written-character recognizing device, such as a digitizer, so as to accept a hand-written character. Alternatively, the input means is constituted so as to accept a sentence or word stored in a memory such as a floppy disk, so that it is possible, e.g., for a teacher to check a document prepared by a plurality of children.

(4) The structure wherein a desired operation can be selected by the operator applying an electric pen onto a screen displayed, instead of using a mouse or keyboard.

(5) The structure wherein the information on usage is described not in the dictionary for correcting spelling but in a usage information dictionary, which is independent of the dictionary for correcting spelling.

(6) The structure wherein infant usages are added to English usages.

(7) The structure wherein detection of misspelled words is performed after the inputting of a document was substantially completed, so that all the misspelled words in the document can be corrected at a time, thereby improving the efficiency of the correcting operation.

(8) The structure wherein mistakes concerning nominal genders are also displayed and corrected at a time after the inputting of a document was substantially inputted.

(9) The structure wherein notification of words which are often used improperly by a foreigner is also performed after the inputting of a document was substantially completed, so that improperly used words are displayed and corrected at a time.

(10) The structure wherein display for notifying the operator, who belongs to a specified language group, of words which he is likely to misspell is provided with a learning function. In this manner, a foreigner who has a comparatively good command of the language used in the inputted document can escape excessive notifications, which may have interfered with the inputting of the document.

(11) The structure wherein the number of words entered in various dictionaries is reduced so that the apparatus is used for children's learning and that the price of the dictionaries and of the whole apparatus is reduced.

(12) The structure wherein a verbal-conjugation dictionary in which the past, present, future conjugations of a verb are entered is provided so that mistakes concerning verbal conjugations made in producing a document in the past tense can be corrected by referring to the verbal-conjugation dictionary.

(13) The structure wherein a single candidate word can be entered in combination with a potential misspelled word, though a plurality of candidate words are displayed in the above embodiments.

(14) The structure wherein the detachable memory is not limited to a disk-type memory but uses, e.g., a high-speed semiconductor memory.

(15) The phonograms are not limited to alphabets, but include the Onmun of Korean language and phonetic symbols used in China as well as Hira-kana letters and Kata-kana letters of Japanese language.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. A mistaken word correcting apparatus for correcting a misspelling and an incorrect usage of a word used in a document, said apparatus comprising:

input means for receiving a user input of a word;

storage means for storing the word inputted into this input means;

display means for displaying the word stored in the storage means;

an incorrect spelling/usage detection dictionary for storing words which are coupled with usage information for each word, the usage information being made up of an indication showing that the word is any of a formal word, a standard word, a vulgar word, a colloquialism, an archaism, a rare word, or a poetic word, or a combination of such types of word;

usage indication operation means for receiving a user indication of a usage for the word stored in the storage means;

mistaken word detecting means for reading a word from the word stored in the storage means, and for detecting whether the read word is stored in the incorrect spelling/usage detection dictionary;

usage determining means for determining, when the mistaken word detecting means detects that the read word is stored in the incorrect spelling/usage detection dictionary, whether the usage received by the usage indication operation means coincides with a usage in the usage information in the incorrect spelling/usage detection dictionary which is stored for the read word;

candidate word generation means for comparing, when the mistaken word detecting means does not detect that the read word is stored in the incorrect spelling/usage detection dictionary, or when the usage determining means determines that the usage received by the usage indication operation does not coincide with the usage in the usage information, the word read by the mistaken word detecting means with all the words stored in the incorrect spelling/usage detection dictionary, and for generating at least one candidate word whose spelling resembles the read word and whose usage in the usage information coincides with the usage received by the usage indication operation means;

candidate word display control means for having the candidate words generated by the candidate word generation means displayed together with the read word on the display means;

candidate word indication operation means for receiving a user indication of one of candidate words displayed by the display means; and word replacement means for replacing the word in the storage means which was read by the mistaken word detecting means with the candidate word indicated by the candidate word indication operation means.

2. The mistaken word correcting apparatus of claim 1, further comprising user dictionary registration means for registering the word read by the mistaken word detecting means, in accordance with a user indication, wherein the candidate word indication operation means receives a registration indication from the user, which has the user dictionary registration means register the read word.

3. The mistaken word correcting apparatus of claim 1, further comprising usage display control means for reading, when the usage determining means determines that the usage received by the usage indication operation means does not coincide with the usage in the usage information, the usage information of the read word from the incorrect spelling/usage detection dictionary and for having the read usage displayed by the display means together with the read word.

4. The mistaken word correcting apparatus of claim 1, wherein the incorrect spelling/usage detection dictionary additionally stores an equivalent standard word for each word which is not a standard word, and the candidate word display control means has the equivalent standard word displayed together with the candidate word.

5. The mistaken word correcting apparatus of claim 1, wherein the incorrect spelling/usage detection dictionary additionally stores a synonym corresponding to each usage of each word, and the candidate word display control means has the synonym displayed together with the candidate words.

6. A document processor for verifying the proper word and usage of the word being input by an operator on an input means, including a storing means for storing the inputted words and a display means for displaying the inputted words, comprising:

dictionary memory means for storing a dictionary of words, including a combination of a correct spelling of a word and a common variant spelling of the word based on one of a language gender, a transposing of letters due to the operator's use of a foreign language and a singular and plural form of the inputted word;

usage setting means for specifying the usage of an inputted word;

incorrect-usage detecting means for determining from the usage setting means and the dictionary memory means whether the inputted word is a candidate for verification;

means for displaying the inputted word with a proposed alternative variant word; and means for selecting one of the inputted word and the alternative variant word for storage as the verified proper word.

7. The document processor of claim 6 further including means for displaying language gender words in different colors representative of masculine, feminine, and neuter gender.

* * * * *